US011790948B1

(12) United States Patent
Wade et al.

(10) Patent No.: US 11,790,948 B1
(45) Date of Patent: Oct. 17, 2023

(54) DATA STORAGE DEVICE WITH MANIPULATED MEDIA MAPPING TO CONTROL ACCESS LATENCY OF DATA CONTAINERS

(71) Applicant: WESTERN DIGITAL TECHNOLOGIES, INC., San Jose, CA (US)

(72) Inventors: Daniel J. Wade, Boulder, CO (US); Scott Burton, Westminster, CO (US); Eric B. Smith, Denver, CO (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/849,159

(22) Filed: Jun. 24, 2022

(51) Int. Cl.
*G11B 20/18* (2006.01)

(52) U.S. Cl.
CPC ...... *G11B 20/1866* (2013.01); *G11B 20/1816* (2013.01)

(58) Field of Classification Search
None
See application file for complete search history.

(56) References Cited

U.S. PATENT DOCUMENTS

| 5,241,531 | A | * | 8/1993 | Ohno | G11B 20/1217 |
| 5,583,842 | A | * | 12/1996 | Wilson | G11B 20/1883 |
| | | | | | 369/53.17 |
| 5,818,654 | A | | 10/1998 | Reddy et al. | |
| 5,844,911 | A | | 12/1998 | Schadegg et al. | |
| 5,848,438 | A | | 12/1998 | Nemazie et al. | |
| 5,937,435 | A | | 8/1999 | Dobbek et al. | |
| 6,101,619 | A | | 8/2000 | Shin | |
| 6,295,176 | B1 | | 9/2001 | Reddy et al. | |

(Continued)

FOREIGN PATENT DOCUMENTS

| EP | 0429435 A2 | 5/1991 |
| KR | 100464440 B1 | 6/2004 |

OTHER PUBLICATIONS

BlockDevices—https://www.cs.yale.edu/homes/aspnes/pinewiki/BlockDevices.html; Jun. 17, 2014; 4 pages.

(Continued)

*Primary Examiner* — Peter Vincent Agustin
(74) *Attorney, Agent, or Firm* — CALDERON SAFRAN & COLE PC (57) ABSTRACT

Various illustrative aspects are directed to a data storage device, comprising one or more disks; an actuator arm assembly comprising one or more heads, and configured to position the one or more heads proximate to disk surfaces of the one or more disks; and one or more processing devices. The one or more processing devices are configured to detect one or more physical defects on a recording medium; designate, in a mapping of the recording medium, the one or more physical defects for exclusion from being assigned to data containers, the data containers configured for assignment of a plurality of logic blocks to the data containers, the logic blocks configured to store the data to be written that are being interleaved across a plurality of sectors based on a distributed sector encoding scheme; and designate one or more artificial defects adjacent to the one or more physical defects for exclusion from being assigned to the data containers in the mapping.

20 Claims, 6 Drawing Sheets

(56) References Cited

U.S. PATENT DOCUMENTS

| | | | |
|---|---|---|---|
| 6,341,109 B1* | 1/2002 | Kayanuma | G11B 20/1883 369/53.17 |
| 6,654,904 B1* | 11/2003 | Andoh | G11B 20/1883 369/53.17 |
| 7,245,445 B2 | 7/2007 | Lee | |
| 8,959,281 B1 | 2/2015 | Malina et al. | |
| 9,059,737 B2 | 6/2015 | Coker et al. | |
| 9,063,838 B1 | 6/2015 | Boyle et al. | |
| 9,368,152 B1 | 6/2016 | Park | |
| 9,632,863 B2 | 4/2017 | Galbraith et al. | |
| 10,261,707 B1 | 4/2019 | Chaichanavong et al. | |
| 10,910,012 B1 | 2/2021 | Kobayashi et al. | |
| 10,998,001 B1 | 5/2021 | Varnica et al. | |
| 11,061,582 B2 | 7/2021 | Oberg | |
| 2001/0042223 A1 | 11/2001 | Hoskins | |
| 2003/0223328 A1* | 12/2003 | Nadershashi | G11B 20/1883 |
| 2004/0100715 A1* | 5/2004 | Smith | G11B 20/1883 |
| 2007/0074087 A1* | 3/2007 | Lo | G11B 20/18 |
| 2013/0038961 A1* | 2/2013 | Song | G11B 20/1883 |
| 2016/0012850 A1 | 1/2016 | Feldman | |
| 2022/0076695 A1* | 3/2022 | Shibasaki | G11B 20/1889 |

OTHER PUBLICATIONS

[PATCHv5 00/14] dm-zoned: metadata version 2 https://www.spinics.net/lists/dm-devel/msg40779.html; May 11, 2020; 5 pages.

Xie et al. "ZoneTier: A Zone-based Storage Tiering and Caching Co-Design to Integrate SSDs with Host-Aware SMR Drives"; https://sc17.supercomputing.org/SC17%20Archive/tech_poster/poster_files/post204s2-file3.pdf; Jul. 10, 2019; 1 page.

Lenny Sharp, "Making Host Managed SMR Work for You—Dropbox's Successful Journey"; https://blog.westerndigital.com/host-managed-smr-dropbox/; Jun. 12, 2018; 10 pages.

Shingled Magnetic Recording + HelioSeal® Technology; https://media.bitpipe.com/io_15x/io_152122/item_2244017/white-paper-shingled-magnetic-recording-helioseal-technology-.pdf; Jun. 2018; 5 pages.

Alexander Thomasian, "Survey and Analysis of Disk Scheduling Methods", ACM SIGARCH Computer Architecture News, vol. 39, No. 2, May 2011, pp. 8-25. https://sci-hub.se/https://doi.org/10.1145/2024716.2024719.

* cited by examiner

DATA STORAGE DEVICE WITH MANIPULATED MEDIA MAPPING TO CONTROL ACCESS LATENCY OF DATA CONTAINERS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

Figure 1:
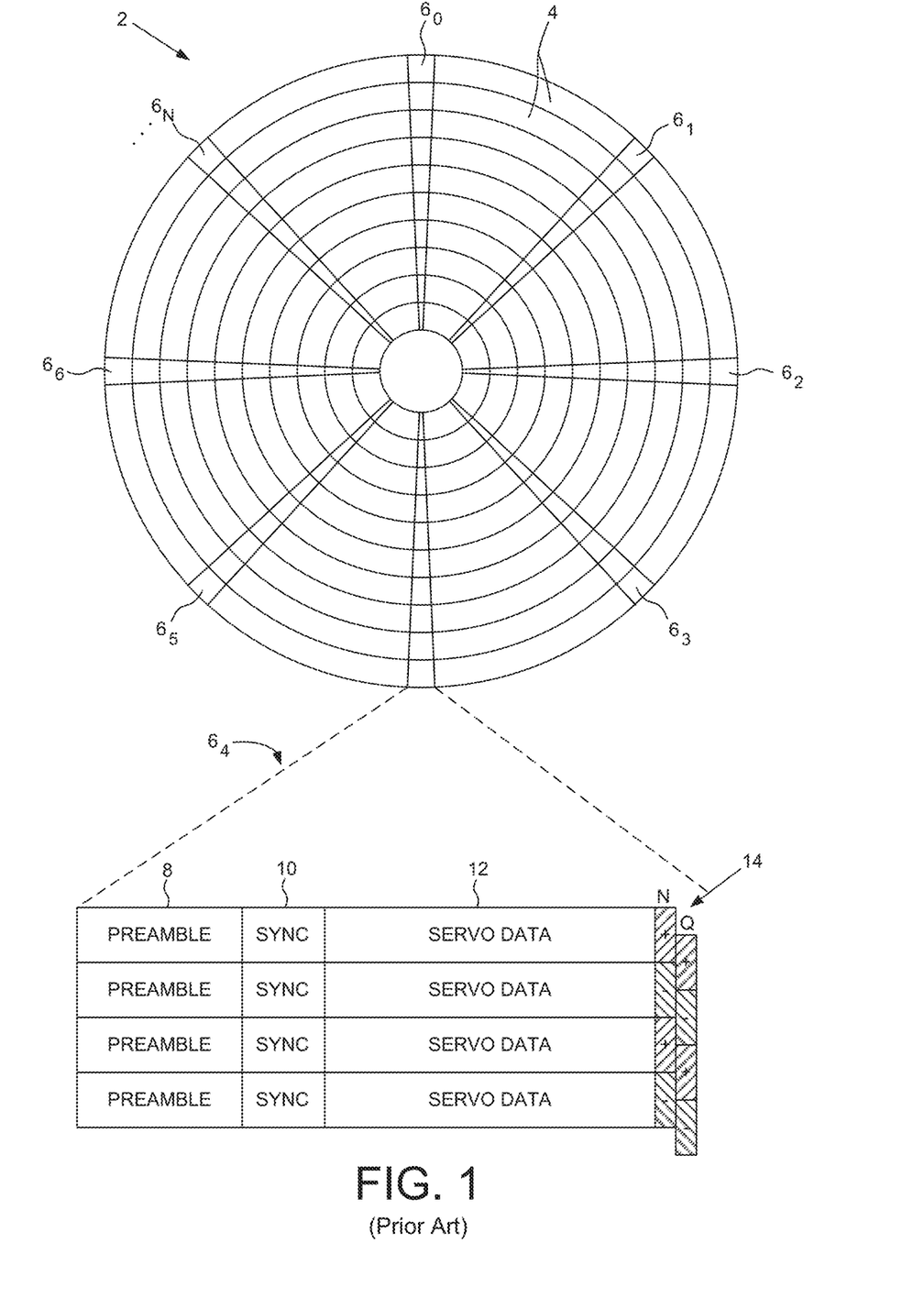
FIG. 1 shows a prior art disk format as comprising a number of radially-spaced, concentric servo tracks defined by servo wedges recorded around the circumference of each servo track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in some examples.

Disk drive control circuitry may use various means to encode data to be written onto disk surfaces. Disk drive control circuitry may, for example, encode data together with error correction code (ECC) bits in code in the form of codewords, such as low-density parity-check (LDPC) codewords. Disk drive control circuitry may interleave encoded data, to be written in an interleaved pattern onto disk surfaces. Disk drive control circuitry may encode blocks of data spanning multiple sectors into codewords in a distributed sector encoding scheme, and perform and implement further advantageous techniques, such as are disclosed in U.S. Pat. No. 9,059,737 issued to Coker et al. and assigned to the same assignee as the present disclosure, and which is incorporated in its entirety by reference herein.

SUMMARY

In various aspects and among other novel advantages of this disclosure, control circuitry of a disk drive may optimize data write and read access latency in a data container system, by generating artificial indications of defects adjacent to real, physical defects in a media mapping of the disk surfaces, and thereby exclude physical defects from being included in data containers, which would otherwise drive up the latency for those containers. Instead, control circuitry of this disclosure may manipulate the media mapping, and thereby the data container assignment system in a recording subsystem (RSS), to ensure that the data containers of the disk drive are largely or completely free of large physical defects or of any physical defects, so that their data write and read access remains at minimal latency and maximal speed.

Various illustrative aspects are directed to a data storage device, comprising one or more disks; an actuator arm assembly comprising one or more heads, and configured to position the one or more heads proximate to disk surfaces of the one or more disks; and one or more processing devices. The one or more processing devices are configured to detect one or more physical defects on a recording medium; designate, in a mapping of the recording medium, the one or more physical defects for exclusion from being assigned to the data containers, the data containers configured for assignment of a plurality of logic blocks to the data containers, the logic blocks configured to store the data to be written that are being interleaved across a plurality of sectors based on a distributed sector encoding scheme; and designate one or more artificial defects adjacent to the one or more physical defects for exclusion from being assigned to the data containers in the mapping.

Various illustrative aspects are directed to one or more processing devices comprising means for detecting one or more physical defects on a recording medium. The one or more processing devices further comprise means for designating, in a mapping of the recording medium, the one or more physical defects for exclusion from being assigned to the data containers, the data containers configured for assignment of a plurality of logic blocks to the data containers, the logic blocks configured to store the data to be written that are being interleaved across a plurality of sectors based on a distributed sector encoding scheme. The one or more processing devices further comprise means for designating one or more artificial defects adjacent to the one or more physical defects for exclusion from being assigned to the data containers in the mapping.

Various illustrative aspects are directed to a method comprising detecting, by the one or more processing devices, one or more physical defects on a recording medium. The method further comprises designating, by the one or more processing devices, in a mapping of the recording medium, the one or more physical defects for exclusion from being assigned to the data containers, the data containers configured for assignment of a plurality of logic blocks to the data containers, the logic blocks configured to store the data to be written that are being interleaved across a plurality of sectors based on a distributed sector encoding scheme. The method further comprises designating one or more artificial defects adjacent to the one or more physical defects for exclusion from being assigned to the data containers in the mapping.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

A distributed sector's access latency, for both read and write, is based on the span of data sectors used to store its data and the number of skipped media sectors within that span. Access latency is directly proportional to the number of skipped media sectors. Large defects like those occurring with sputter shadow can become noticeable during small block random reads when the sputter shadow area may increase to, for example, 25% of the track.

A container is a large block of data stored across multiple media sectors. In a data container system, storage and retrieval of a container's data may typically require accessing all of its data sectors. Control circuitry of this disclosure may scan and map physical defects on the disk surfaces and designate the sectors that include them as defective sectors to be skipped in write and read operations. True defects in the disk drive media surfaces may also be referred to herein as physical defects or real defects to distinguish clearly from artificial defects, or designated defects, which exist only as designations in a mapping of the disk surfaces, as designated by control circuitry of the disk drive in accordance with aspects of the present disclosure. A "defect" or a "physical defect" as described herein may thus refer to any defect, that is, any true or actual defect, as distinguished from an "artificial defect" or "designated defect" which exists as a mapping indication in a mapping of the disk drive media surface, as indicated by control circuitry of this disclosure, and not as an actual defect on the disk drive media surface. Throughout this description, the mapping of the disk surface may be distinguished from the disk surface itself, and the designation of both real and artificial defects in the mapping may be distinguished from the state of the disk surface itself, with its real defects, and its functional, non-defective regions, most of which are used for writing and reading data and some of which may be (at least temporarily) disused because they correspond to the artificial defects designated in the mapping.

A container constitution defines which data sectors map to which containers. The container constitution is blind to skipped defective sectors on the track as indicated by the mapping. Skipped sectors not used for data storage located within the span of the container data sectors have no impact on the container's ability to store data. Under normal conditions, the skipped sectors have no noticeable effect on a container's access latency.

Skipped defective sectors within a container boundary increase the time it takes to read or write the container. In the worst case, the latency to access a single container could equal a complete revolution of the disk. As a particular example, if a track has 360 sectors, the container size is 16 sectors, the first and last sectors are not mapped out as defects to be skipped, and a total of 344 sectors on the track are mapped out as defects to be skipped, then it would take a complete revolution of the disk to access that container.

In various examples of this disclosure, control circuitry of a disk drive may insert artificial defects adjacent to one or more physical defects, thereby locating those one or more physical defects in between containers, rather than include those physical defects within containers, and thereby avoiding the heightened access latency that would come with inclusion of those physical defects within containers. Control circuitry of a disk drive of this disclosure may maintain optimal access latency for a single distributed sector or container by adding artificial defects around the large real or physical defects so that the distributed sector constitution puts the large real defect between distributed sectors and between containers, among other novel advantages in accordance with aspects of this disclosure, as further described below.

Figure 2A:
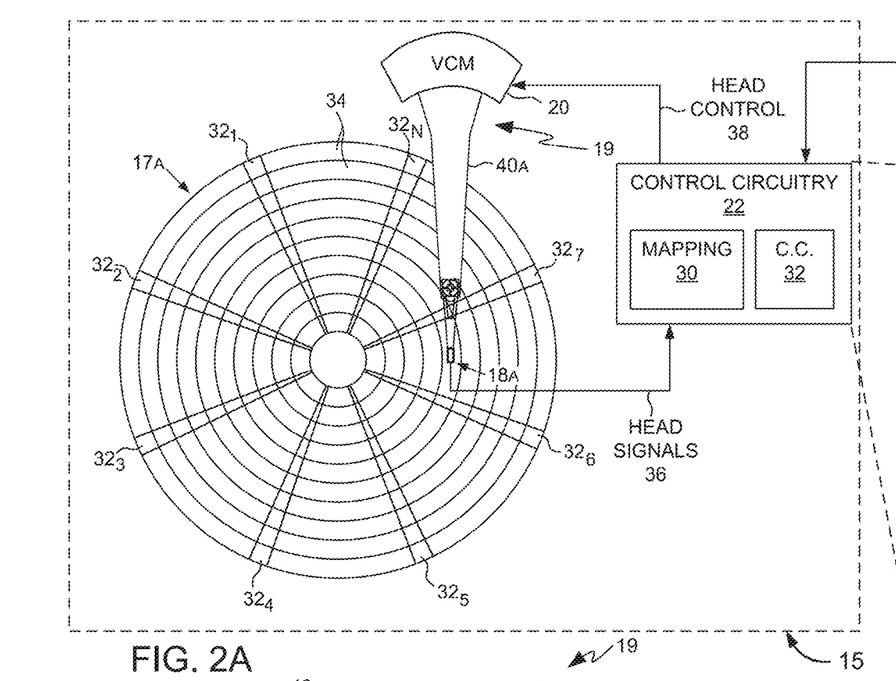
FIGS. 2A and 2B illustrate conceptual block diagrams of a top view and a side view of a data storage device in the form of a disk drive, in accordance with aspects of the present disclosure.
Figure 2B:
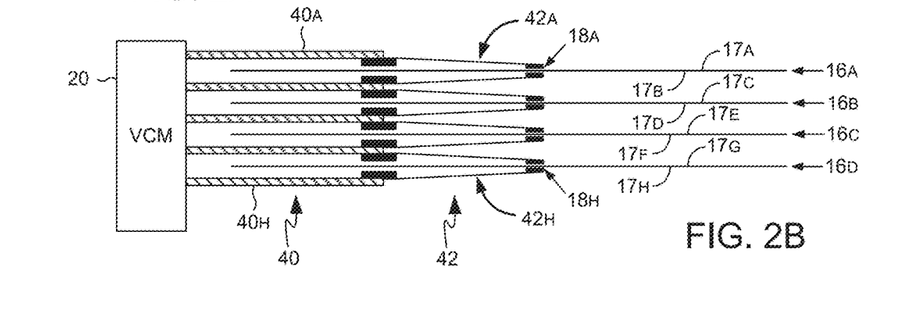
Figure 2C:
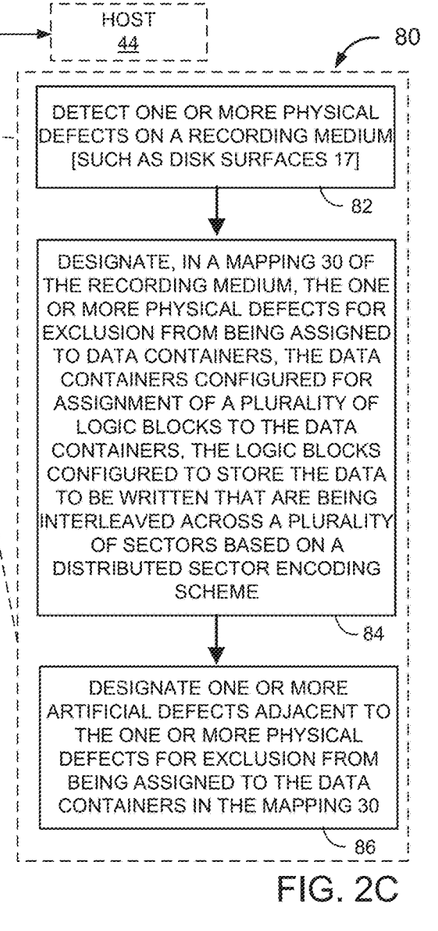
FIG. 2C depicts a flowchart for an example method that control circuitry of a disk drive may perform or execute in controlling the operations of the disk drive, including operations involved in manipulating a media mapping to indicate artificial defects and to control access latency of data containers, in accordance with aspects of this disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that control circuitry 22 of disk drive 15 may perform or execute in controlling the operations of disk drive 15, in accordance with aspects of the present disclosure, including operations involved in manipulating a media mapping to indicate artificial defects and to control access latency of data containers (or "containers"), in accordance with aspects of this disclosure. Control circuitry 22 may perform such operations for inserting artificial defects into data tracks, to add designations of artificial defects to a media mapping to remove or crowd out data sectors from candidate containers that include large physical defects, and thereby eliminate containers that would include large physical defects and would impose high latency for access, thereby promoting low latency for container data access in a data container system, as further described below, in accordance with aspects of the present disclosure.

The terms "physical defect" and "physically defective sector" may be used synonymously herein, with the understanding that they are not identical, but that a physically defective sector is a sector that is either fully or at least partly occupied or marred by a physical defect, thereby rendering that sector physically defective. The terms "artificial defect," "designated defect," and "artificially defective sector" may be used synonymously herein, with the understanding that they are identical terms, because they each refer identically to a sector rendered or designated as defective by control circuitry 22 in a media mapping in accordance with techniques of this disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend one of read/write heads 18 ("heads 18") in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to comprise both the very outer surface layer of a disk as well as a volume of disk matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Various examples may comprise two, three, or any number of fine actuators in addition to the one or more primary actuators, such as milliactuators and/or microactuators disposed on actuator arm assembly 19. Actuator arm assembly 19 and/or any of these other examples may thus constitute and/or comprise an actuator mechanism, in various examples.

Control circuitry 22 may organize and/or encode data (e.g., in the form of low-density parity-check (LDPC) codewords, or into any other applicable encoding) into logic blocks of a selected size (measured in terms of amounts of data), for example, 4 kilobytes (kB) of data per logic block, or any other amount of data per logic block in other examples. Control circuitry 22 may map and interleave the logic blocks in an interleaving pattern of one or more logic blocks per each distributed sector across the media blocks, in a recording subsystem (RSS). In one example, control circuitry 22 may assign, map, and interleave eight logic blocks of 4 kB of data each in an interleaved pattern per each distributed sector across the media blocks, thereby generating distributed sectors of 32 kB of data each. In some examples, control circuitry 22 may implement up to a maximum of 16 interleaves per each media sector, and may implement a distributed sector of size larger than 16, such that the first media sector has interleaves from only the first 16 logical blocks. In other examples, control circuitry 22 may assign, map, and interleave any other numbers of logic blocks of any size into each distributed sector, and with interleaves from any other number of source logical blocks.

Control circuitry 22 may map each distributed sector to correspondingly sized, physical dispersed, distributed areas of one or more disk surface media blocks on one or more disk surfaces 17 of disk drive 15. The media blocks may be spread across write gates of disk surfaces 17, which may be or include the writeable areas of disk surfaces 17 that aren't occupied by control patterns such as servo patterns. Mapping the logic blocks of data into relatively large distributed sectors spread across disk surfaces 17 may provide certain advantages, such as averaging variations in track misregistration (TMR) and signal-to-noise ratio (SNR), diluting the impact of defects in the disk surface across logic blocks, and achieving more closely spaced operable data tracks to achieve higher data density of data tracks per width, such as may be measured in tracks per inch (TPI), even with the same number of logic blocks and relative to data density as measured in blocks per inch (BPI).

In a data container system, such distributed sectors may have any of various relationships with data containers, such as a one-to-one correspondence, a one-to-many, a many-to-one, or any other form of correspondence of data containers with distributed sectors, in various examples. Interleaving may not necessarily change how disk drive 15 writes data, but it may change the payloads of write operations. To read each interleaved logic block may require reading across all the corresponding media blocks across which the logic block is written.

Under the encoding scheme, interleaving logic blocks may logically spread the effects of sections of a media defect on disk surfaces 17, such as a scratch or any other mechanical or chemical infringement or other off-nominal effect on disk surfaces 17 that prevents or inhibits nominal writes to and reads from that infringed section of disk surfaces 17, across logic blocks. Spreading the defect across logic blocks may enable writing tracks closer together, thereby increasing data density as measured in tracks per inch (TPI). A "physical defect" as described herein may include a scratch or any other type of mechanical or chemical infringement or other off-nominal effect on disk surfaces 17.

Distributed sectors, or data containers, may be limited in size by the size of a memory buffer of control circuitry 22, in various examples. Control circuitry 22 may load the entirety of data to encode in one distributed sector into the memory buffer before writing that distributed sector to one or more disk surfaces 17. Control circuitry 22 may encode, based on a distributed sector encoding scheme, data into a plurality of logic blocks of data. The logic blocks of data comprise the data to be written being interleaved across a plurality of sectors, and subject to assignment to data containers. The control circuitry may then write the data in the logic blocks. Control circuitry 22 may write the data in the logic blocks to one media block on a disk surface 17 at a time, and each media block on a disk surface 17 may comprise interleaved data from some or all of the logic blocks comprised in the applicable distributed sector, in accordance with the distributed sector encoding scheme. The memory buffer may be a dynamic random access memory (DRAM) buffer, in various examples. Control circuitry 22 may also comprise a non-volatile flash memory storage, in various examples. Disk drive 15 of this disclosure may comprise a substantially large memory buffer, relative for example to traditional memory buffer sizes in the industry, in some examples, which may help enable use of and encoding data into substantially large distributed sectors.

The size of a container may be defined as the number of sectors and/or the number of logic blocks used by the container to store its data. Control circuitry 22 may specify a container constitution, which may define all of the criteria and policies for a track layout and how to assign data logic blocks into containers, in various examples of this disclosure. Distributed sectors may store a large block of data interleaved across multiple media sectors. Distributed sectors may be implemented having any of various sizes, in various implementations.

Control circuitry 22 may assign and map a set of logic blocks to a corresponding set of media sectors, in a one-to-one or other selected correspondence between number of logic blocks and number of media sectors to which that collection of logic blocks is written, in an interleaved manner, in various examples. The media sectors may correspond to sectors of a track or of one or more tracks written to the media surface or disk surface 17. Control circuitry 22 may thus assign logic blocks, in a number of logic blocks that may have a one-to-one or other correspondence to a number of corresponding media sectors, to be written to a given track or set of tracks, in various examples. Control circuitry 22 may thus define container constitutions, assign data to logic blocks and distributed sectors, and assign the layout and placement of data. Control circuitry 22 may equivalently be referred to as assigning data blocks and data containers to tracks or sections of tracks on disk surfaces 17, and assigning tracks or sections of tracks on disk surfaces 17 to data blocks and data containers.

Thus, in various examples, a data storage device such as disk drive 15 may comprise one or more disks 16; an actuator mechanism such as actuator arm assembly 19 configured to position one or more heads 18 proximate to disk surfaces 17 of the one or more disks 16; and one or more processing devices, such as the one or more processing devices of control circuitry 22. In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, control circuitry 22 may detect one or more physical defects on a recording medium, such as disk surfaces 17 (82). Control circuitry 22 may further designate, in a mapping 30 of the recording medium, the one or more physical defects for exclusion from being assigned to data containers, the data containers configured for assignment of a plurality of logic blocks to the data containers, the logic blocks configured to store the data to be written that are being interleaved across a plurality of sectors based on a distributed sector encoding scheme (84). Control circuitry 22 may further designate one or more artificial defects adjacent to the one or more physical defects for exclusion from being assigned to the data containers in the mapping 30 (86) of the recording medium. Control circuitry 22 may comprise a mapping manipulator module 28 which may implement the designating one or more artificial defects adjacent to the one or more physical defects in a mapping 30 of disk surfaces 17 or other recording medium, or otherwise designate the one or more physical defects for exclusion from being assigned to data containers. Control circuitry 22 may further perform additional actions, methods, and techniques, in accordance with various aspects including as further described herein.

Figure 3:
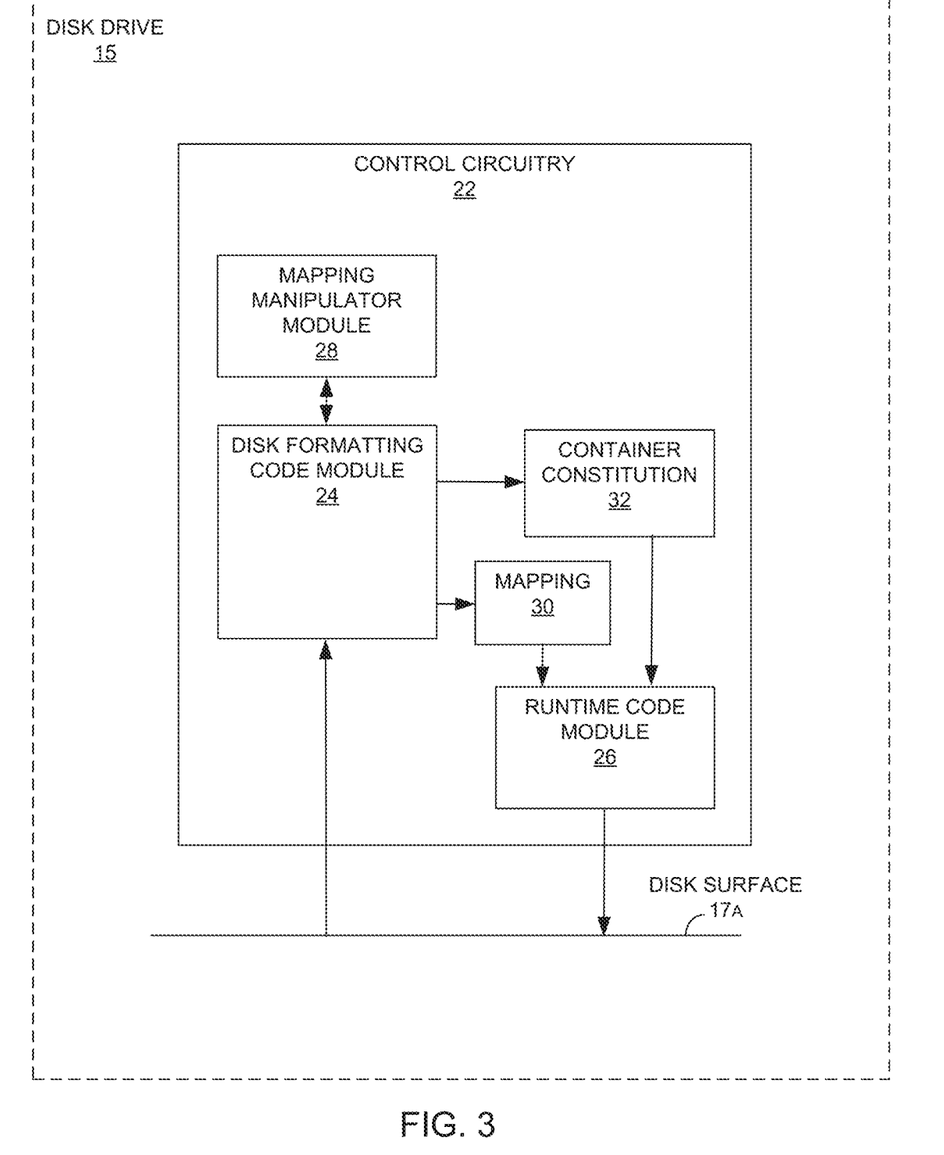
FIG. 3 illustrates a conceptual block diagram of a disk drive with further details of control circuitry, in accordance with illustrative aspects of this disclosure.

FIG. 3 illustrates a conceptual block diagram of disk drive 15 with further details of control circuitry 22, in accordance with illustrative aspects of this disclosure. Control circuitry 22 may comprise a disk formatting code module 24, a runtime code module 26, mapping manipulator module 28, mapping 30, and container constitution 32. Disk formatting code module 24 and runtime code module 26 may comprise any hardware and/or software involved in implementing, executing, and/or embodying disk formatting code and runtime code, respectively, in accordance with aspects of the present disclosure. Disk formatting code module 24, runtime code module 26, and mapping manipulator module 28 may comprise any hardware and/or software and are not limited by any other definitions of the term "module" in any other software or computing context.

Disk formatting code module 24 may handle scanning, mapping, and/or and formatting disk surfaces 17 prior to, or intermittent with, ordinary write and read operations of disk drive 15. As part of this, disk formatting code module 24 may scan for and map defects in disk surfaces 17 and generate mapping 30 of physical sectors or areas of the recording medium of disk surfaces 17 to use for ordinary write and read operations, which may skip over defects in disk surfaces 17. Mapping 30 may constitute or be implemented as a mapping, a map, a list, a data file, a data store, or a repository of mapping information in any other form, which provides indications of the status of locations on disk surfaces 17, and where to write and not to write on disk surfaces 17. Disk formatting code module 24 may also update mapping 30 over time, including to add designated defects or artificial defects to mapping 30, as directed by mapping manipulator module 28. Disk formatting code module 24 may also update mapping 30 to remove designated or artificial defects again from mapping 30, again as directed by mapping manipulator module 28, in some examples. Control circuitry 22 may be configured to write data to the recording medium of disk surfaces 17 pursuant to mapping 30. Disk formatting code module 24 may also write to container constitution 32, in accordance with a specification for data containers and with mapping 30. The specification for the data containers may specify rules or protocols for how to assign containers, such as the enabled size or sizes of containers to assign, which may be in terms of numbers of data blocks, for example. A different module or component or piece of software comprised in control circuitry 22 may also handle writing to container constitution 32 and assigning of containers to tracks of disk surfaces 17, in other examples.

Runtime code module 26 may handle ordinary write and read operations of disk drive 15. In executing write and read operations, runtime code module 26 may simply refer to results generated by disk formatting code module 24, such as mapping 30 of physical sectors or areas of disk surfaces 17, including disk surface 17A, to use for ordinary write and read operations. Runtime code module 26 may thus simply operate with reference to mapping 30 of physical sectors or areas of disk surfaces 17 to use for ordinary write and read operations as generated by disk formatting code module 24 and mapping manipulator module 28. Runtime code module 26 may thus operate without any capability of its own to detect or account for defects, and may not have any independent need for detection of or accounting for defects, since that would be redundant with mapping 30 that it is provided by disk formatting code module 24 and mapping manipulator module 28. Runtime code module 26 may be configured to write data to and read data from data containers assigned to disk surfaces 17.

In various examples, mapping manipulator module 28 of control circuitry 22 may select one or more functional, non-defective blocks adjacent to a physical defect, on either or both sides of the physical defect, designate those selected blocks as defects (thus, as "designated defects" or "artificial defects") in mapping 30, and then confirm instructions for disk formatting code module 24 to assign new containers based on mapping 30 comprising the new artificial defects.

In various examples, mapping manipulator module 28 may communicate these designations of defects to disk formatting code module 24, prior to the writing of the zone by runtime code module 26. Disk formatting code module 24 may then update mapping 30 of the applicable disk surfaces 17 (e.g., generate a newly updated mapping 30 in place of an initially or previously generated mapping 30) to add the newly designated defects to its mapping 30 of the applicable disk surfaces 17. In various examples, mapping manipulator module 28 may write such new mappings to mapping 30 directly, without going through disk formatting code module 24. Such "designated defects" or "artificial defects" are thus not true defects or actual defects, but merely designated as defects in mapping 30, reversibly and temporarily (or with the capability of being temporary, unless control circuitry 22 elects to keep such mappings 30 more or less permanent or long-term in some applications), in the updated mapping 30 of applicable disk surfaces 17.

Runtime code module 26 may then write data to and read data from the assigned containers, on disk surfaces 17, making reference to the mapping 30 of the disk surfaces 17 as surfaced to it by disk formatting code module 24, to conduct its write and read operations as it normally would. In this way, control circuitry 22 may provide for containers that exclude all physical defects, or all large physical defects, in various examples, and that runtime code module 26 is thus able to write to and read from with low or optimized latency and high speed, among other novel advantages.

Various implementations of this disclosure may thus accomplish novel, advantageous effective changes in the effective behavior of the runtime code, to write to and read from containers without having latency of these operations degraded by defects being included in the containers, without necessarily needing to make any change to the runtime code itself, as it has been previously implemented and validated. Rather, control circuitry 22 as illustrated in FIG. 3 may modify the effective behavior of runtime code module 26 by only changing its inputs, by way of mapping 30, as generated by mapping manipulator module 28 and/or disk formatting code module 24, in various examples.

Such designated defects or artificial defects may thus exist only as designations by the formatting code, and so are impermanent and reversible at will, and without impacting reliability. If and when the formatting code of control circuitry 22 overwrites containers and assigns new containers to the same disk surface, control circuitry 22 may freely overwrite the designations of artificial defects at will in a newly updated mapping 30, and freely make use of blocks for data that it had previously designated as defects. Control circuitry 22 may remove and reuse designated or artificial defects without impacting reliability (in contrast to the removal of a real defect, which can impact reliability).

In addition to the specific illustrative examples described above, other examples of the present disclosure may be implemented in other forms and configurations. Mapping manipulator module 28 may comprise or be comprised in disk formatting code module 24 in other examples. Various examples are not limited to implementing any of the particular components, techniques, or advantages described above. In various examples, control circuitry 22 may comprise and use any of a variety of components, elements, and techniques for aligning the ends of zones with the ends of containers.

Figure 4:
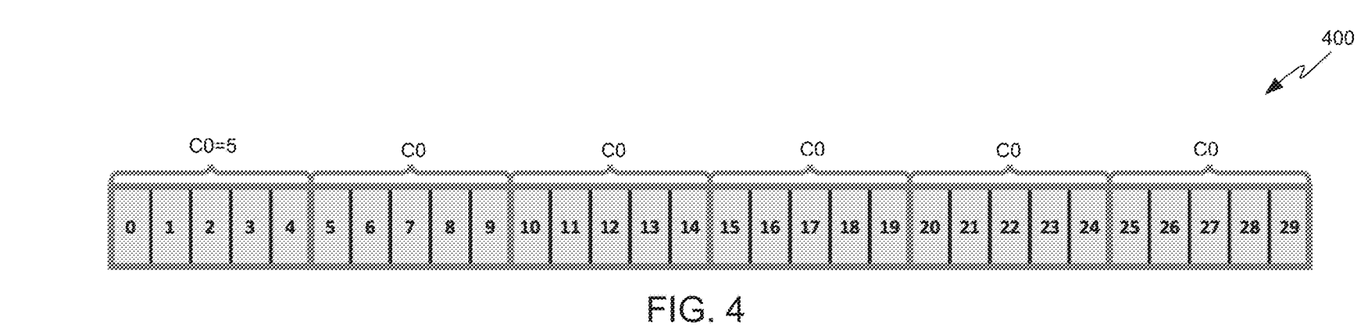
FIG. 4 shows an example track with thirty sectors and no physical defects, as an example basis of comparison for subsequent figures.

FIG. 4 shows an example track 400 with thirty sectors and no physical defects, as an example basis of comparison for subsequent figures. For a container size of five sectors, container constitution 32 comprised in control circuitry 22 maps all the track's sectors in sequence to respective containers for a total of six containers, each spanning five sequentially adjacent physical sectors.

Figure 5A:
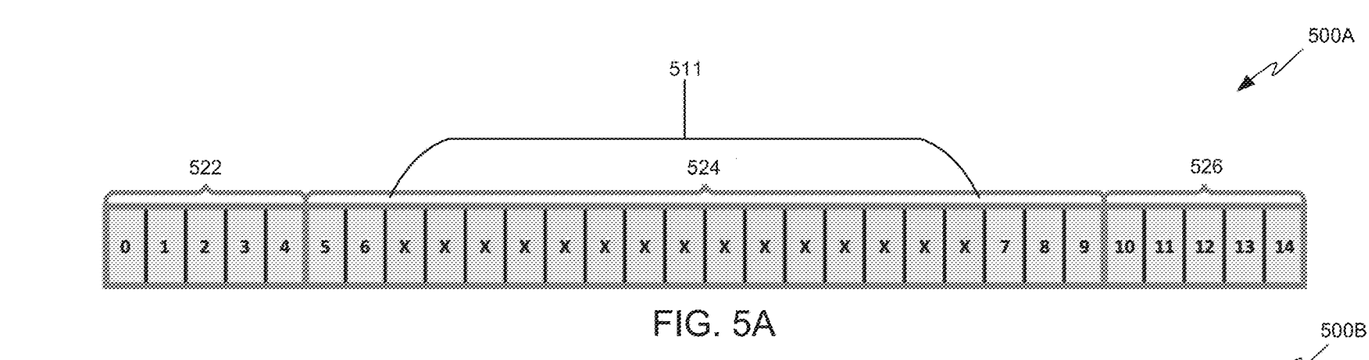
FIG. 5A shows an example track in an intermediate state with thirty sectors and a large physical defect occupying fifteen of those sectors, in an intermediate section of the track, prior to having had any artificial defects mapped adjacent to the physical defect.

FIG. 5A shows an example track 500 in an intermediate state shown as track 500A with thirty sectors and a large physical defect 511 occupying fifteen of those sectors, in an intermediate section of track 500A, prior to having had any artificial defects mapped adjacent to the physical defect 511. Control circuitry 22 may map these fifteen sectors occupied by physical defect 511 as physically defective sectors to be skipped and not used for data storage. Container constitution 32, comprised in control circuitry 22, may then place the fifteen remaining, usable data sectors into three containers 522, 524, 526 of size five usable data sectors each, as shown in the example shown in FIG. 5A prior to a mapping of artificial defects in accordance with this disclosure, among which the first and last containers 522, 526 each comprises five usable data sectors in adjacent sequence, while the middle container 524 comprises the large physical defect 511, between usable data sectors, and separating the first two usable data sectors and the final three usable data sectors from each other. Container 524 thus comprises twenty physical sectors, even though only five of those sectors may be used for data storage. The latency to access container 524 is equivalent to the latency of twenty physical sectors, the same as that of four containers of five sectors each without skipped sectors.

Figure 5B:
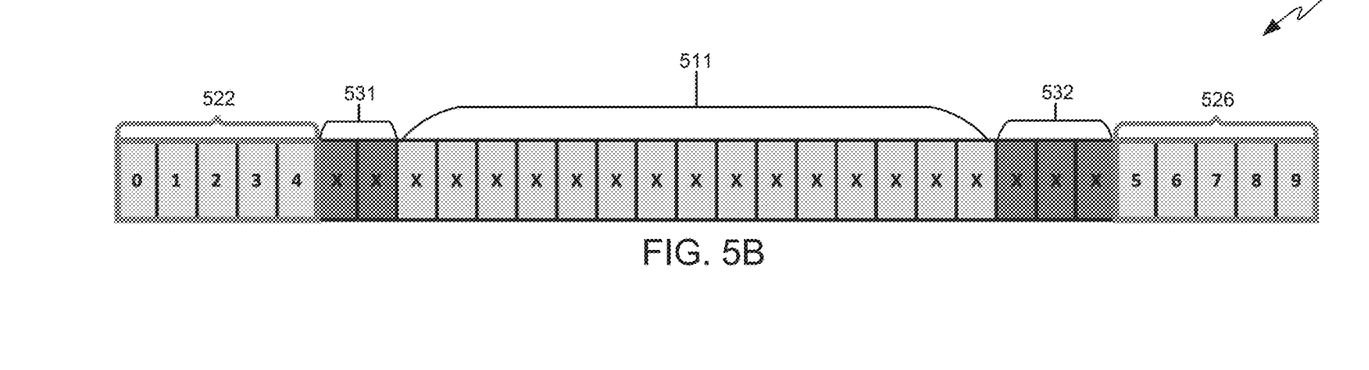
FIG. 5B shows the example track of FIG. 5A in a new state after control circuitry has mapped artificial defects to the track, adjacent to and on either side of the physical defect, in such a way as to eliminate any containers that comprise physical defects and which would have had heightened latency due to inclusion of those physical defects, in accordance with aspects of the present disclosure.

FIG. 5B shows example track 500 in a new state as track 500B, which is the same track 500 as in the state shown as track 500A of FIG. 5A except in a new state after control circuitry 22 has mapped artificial defects 531, 532 to the track, adjacent to and on either side of physical defect 511, in such a way as to eliminate any containers that comprise physical defects and which would have had heightened latency due to inclusion of those physical defects, in accordance with aspects of the present disclosure. Instead, control circuitry 22 has replaced two sectors by artificial defect 531 and three sectors by artificial defect 532, (corresponding to the first two and last three sectors of container 524 of FIG. 5A, which does not exist in the example of FIG. 5B).

Control circuitry 22 may, for example, detect a physical defect somewhere in the middle of the (pre-revised) track 500. Control circuitry 22 may then determine how many integer number of one or more containers may fit from the start of track 500A working forward toward the initial edge of the physical defect 511, if any, and determine how many integer number of one or more containers may fit from the end of track 500A working backward toward the final edge of the physical defect 511, if any. Control circuitry 22 may then assign integer numbers of one or more containers each, according to its determinations of the available space for integer numbers of one or more containers at each end of the track, to the beginning and ending stretches of track 500.

Control circuitry 22 thereby reduces the total number of mapped and usable data sectors on track 500B from fifteen to ten, which are assigned to containers 522 and 526, which comprise five physical sectors each, and are of accordingly minimal latency. Control circuitry 22 has located artificial defects 531, 532 adjacent to and on either side of physical defect 511 so that the large span of defective sectors occupied by physical defect 511 is located entirely in between containers (i.e. containers 522 and 526), rather than occupying and imposing high latency on one long container (i.e. container 524 of FIG. 5A).

While control circuitry 22 inserts artificial defects in such a way to align containers with the beginnings and endings of track 500 in the examples above, control circuitry 22 may also insert artificial defects in any other applicable pattern or permutation and thereby render containers in any other applicable pattern or permutation, in other examples. For example, in track 500, there are two regions of track 500 that each have a large enough span of functional (i.e. non-physically-defective) sectors to fit one container: the initial region of the first seven functional sectors, and the concluding region of eight functional sectors. In the initial region of the first seven functional sectors, control circuitry 22 may select any of three different possible sequences of five functional sectors in a row to form a container (either sectors 0 through 5 as in track 500B as shown in FIG. 5B, or 1 through 6, or 2 through 7), and designate the remaining two functional sectors as artificial defects (either sectors 6 and 7 as in track 500B as shown in FIG. 5B, or sectors 0 and 7, or 0 and 1, respectively). Analogously, in the final region of the final eight functional sectors, control circuitry 22 may select any of four different possible sequences of five functional sectors in a row to form a container (either sectors 7 through 11, or 8 through 12, or 9 through 13, or 10 through 14 as in track 500B as shown in FIG. 5B), and designate the remaining three functional sectors as artificial defects (either sectors 12 through 14, or sectors 7, 13, and 14, or sectors 7, 8, and 14, or 7 through 9 as in track 500B as shown in FIG. 5B, respectively).

Figure 6A:
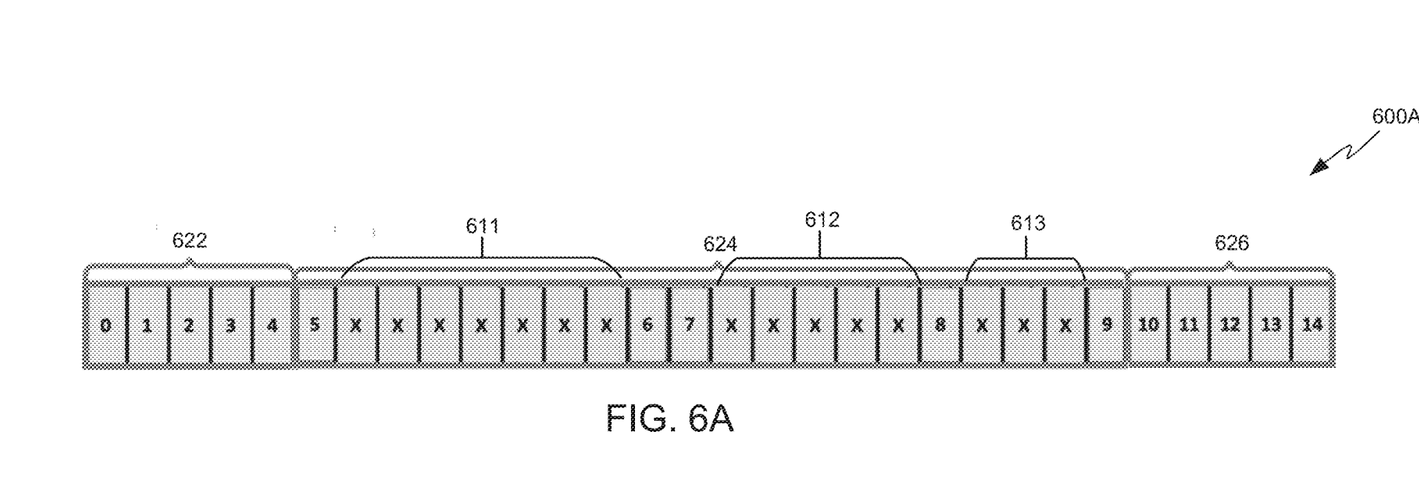
FIG. 6A shows another example track, with 30 sectors and which has three physical defects occupying three respective spans of defective sectors, prior to having had any designated defects mapped adjacent to any physical defects.

FIG. 6A shows another example track 600A, with 30 sectors, analogous in some ways to track 500 of FIG. 5A, and has three initial containers 622, 624, 626, but which has three physical defects 611, 612, 613 occupying three respective spans of defective sectors in this example, without or prior to having had any designated defects mapped adjacent to any physical defects. In particular, the seventh through thirteenth, sixteenth through twentieth, and twenty-second through twenty-fourth sectors are occupied by physical defects 611, 612, 613 (index numbers 6 through 12, 15 through 19, and 21 through 23, respectively, in an indexing that begins with 0 for the first sector). Control circuitry 22 may detect and map these three physical defects 611, 612, 613 in an initial mapping of a disk surface, thereby configuring itself to skip the sectors occupied by these three physical defects in write and read operations, and refrain from attempting to use them for data storage. While control circuitry 22 has assigned containers 622 and 626 each to consecutive sequences of five blocks each, control circuitry 22 has assigned container 624, prior to any action of assigning artificial defects, to the large swath of 20 sectors in the middle, 15 of which are occupied by the three physical defects 611, 612, 613, and the five usable blocks of which are scattered among the three physical defects 611, 612, 613. Container 624 thus has equivalent latency of accessing 20 blocks, just to write or read to its five functional blocks.

Figure 6B:
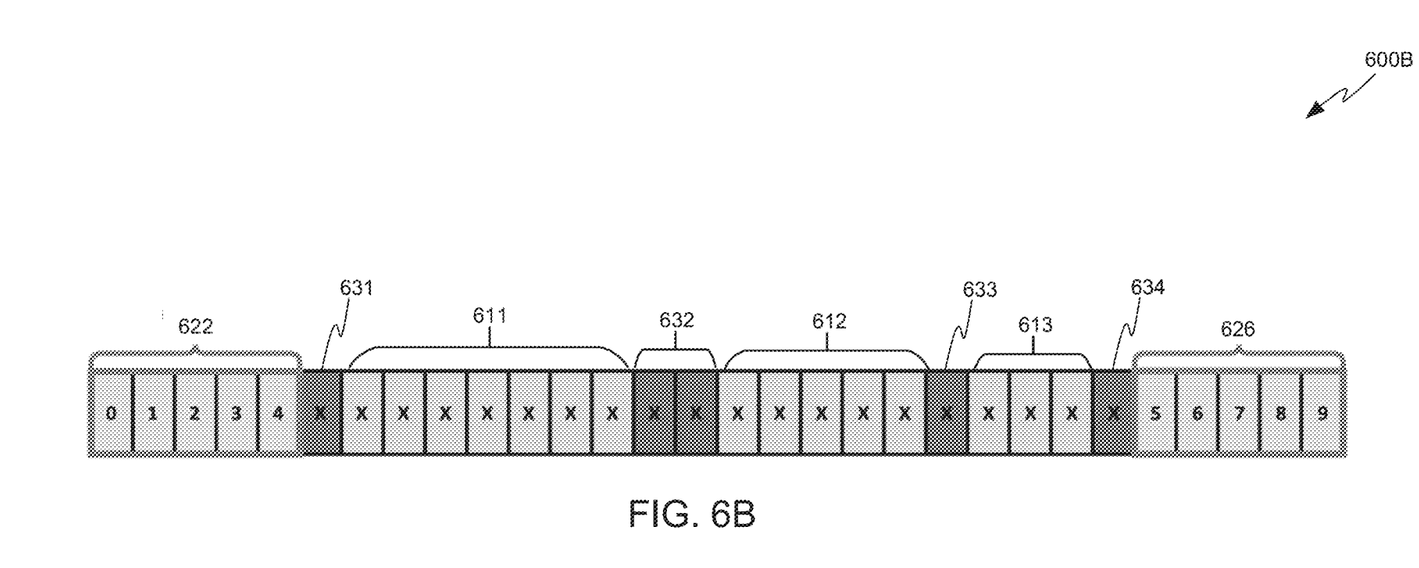
FIG. 6B shows the example track of FIG. 6A in a new state after control circuitry has mapped artificial defects to the track, adjacent the three physically defective sectors, in such a way as to eliminate any containers that comprise physical defects and which would have had heightened latency due to inclusion of those physical defects, in accordance with aspects of the present disclosure.

FIG. 6B shows example track 600B, which is the same as track 600A of FIG. 6A except in a new state after control circuitry 22 has mapped artificial defects 631, 632, 633, 634 to the track, adjacent the three physically defective sectors 611, 612, 613, in such a way as to eliminate any containers that comprise physical defects and which would have had heightened latency due to inclusion of those physical defects, in accordance with aspects of the present disclosure. Instead, the mapping of the artificial defects has left track 600B with only containers 622, 626, which comprise five physical sectors each, and are of accordingly minimal latency. As with example track 500B of FIG. 5B, control circuitry 22 has only replaced five data sectors in total with artificial defects in mapping 30, though in this example track 600B, the five replaced sectors are more spread out. Analogously with example track 500B of FIG. 5B, control circuitry 22 has mapped artificial defects 631, 632, 633, 634 adjacent to physically defective sectors 611, 612, 613 in such a way that all physical defects are excluded from any containers, rather than occupying parts of containers and imposing higher latency on them.

Thus, control circuitry 22 may, for example, detect multiple physical defects somewhere in (pre-revised) track 600. Control circuitry 22 may then determine how many integer numbers of one or more containers, if any, may fit into track 600, at any positions between the beginning and ends of track 600 and between any physical defects occupying any parts of track 600. Control circuitry 22 may then assign integer numbers of one or more containers each, according to its determinations of the available space for integer numbers of one or more containers at each end of the track, to the beginning and ending stretches of track 600, in this example. Control circuitry 22 may thus determine an integer number of one or more containers that may fit into a track on the recording medium, at any available positions between a beginning and an end of the track and between any of the one or more physical defects; assign the integer number of one or more containers among the available positions; and designate any remaining portions of the track as artificial defects, in various examples.

While control circuitry 22 may insert artificial defects in such a way to align containers with the beginnings and endings of track 600 as in the examples above, control circuitry 22 may also insert artificial defects in any other applicable pattern or permutation and thereby render containers in any other applicable pattern or permutation, in other examples, analogously as described above with reference to FIGS. 5A and 5B, as applied to the details as shown and described in FIGS. 6A and 6B, in which the beginning and end of the track each host only six usable sectors in a sequence. Thus, for each of these two available sequences of six sequential functional sectors, in a system using containers of five sectors of length each, control circuitry may designate either the first or the last of the six functional sectors as an artificial defect, and then use the remaining sequence of five functional sectors in a row as a container. In other examples, available sequences of integer numbers of potential containers of five blocks in a row each may be scattered throughout any locations of a track, and control circuitry 22 may designate artificial defects in any applicable pattern or permutation to enable designation of defect-free containers at any applicable locations or permutations of functional sectors in the track.

In various examples, control circuitry 22 may be configured to designate a first artificial defect on a first side of a selected physical defect, from among the one or more physical defects, and a second artificial defect on a second side of the selected physical defect, as in the examples of designating artificial defects on both sides of the physical defect in FIG. 5B, and of designating artificial defects on both sides of each of the three physical defects in FIG. 6B. In various examples, the one or more physical defects comprise at least a first physical defect and a second physical defect, and control circuitry 22 may be configured to designate at least a first artificial defect adjacent to the first physical defect and at least a second artificial defect adjacent to the second physical defect, as in the example of FIG. 6B.

Figure 7:
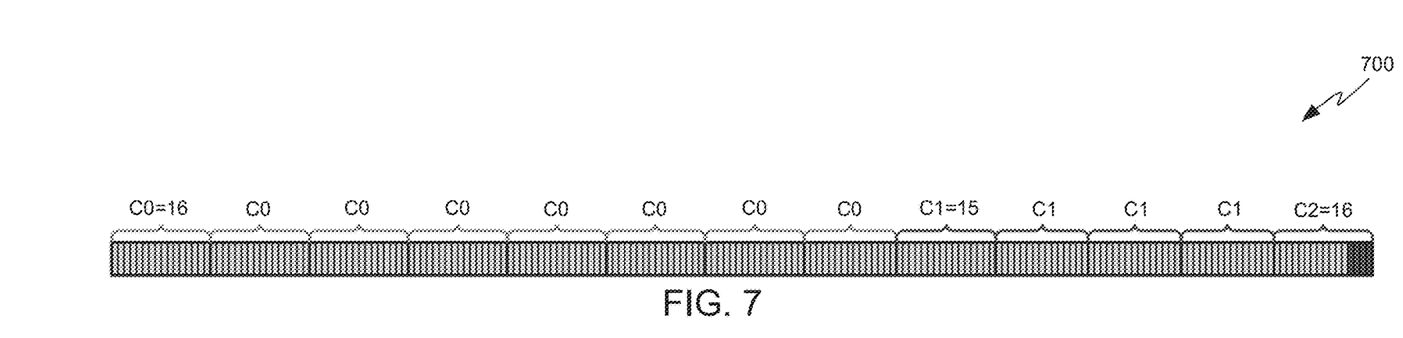
FIG. 7 shows an example track which comprises sectors, and no physical defects, and no artificial defects, and thus no skipped sectors, as an example basis of comparison for subsequent figures.

FIG. 7 shows an example track 700 which comprises 204 sectors, and no physical defects, and no artificial defects, and thus no skipped sectors, as an example basis of comparison for subsequent figures. Track 700 has containers of two different sizes, of 16 and 15 sectors per container, in a variable size distributed sector system in this example, as may be defined by an implementation of the recording subsystem (RSS) as a balanced optimization among various constraints including complexity, defect mitigation, track density, latency, and error correction capability, in shingle magnetic recording (SMR) and/or in conventional magnetic recording (CMR), in this example. In particular, track 700 has nine containers of size 16 sectors and four containers of size 15 sectors, arranged in an order of first eight containers of size 16 sectors, then the four containers of size 15 sectors, then a final container of size 16 sectors, in this example.

Figure 8A:
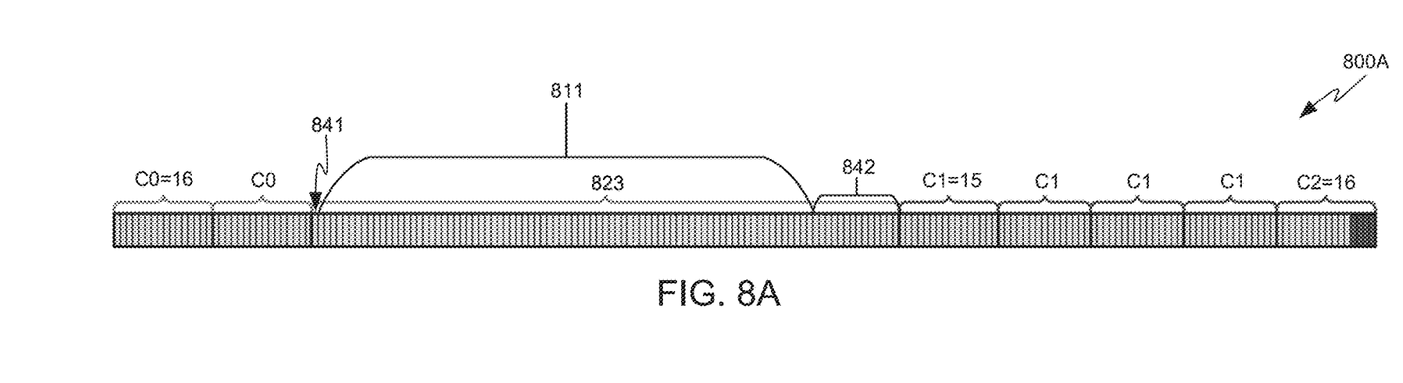
FIG. 8A shows a track 800 in a first state, which comprises 204 sectors, and has a physical defect of 80 sectors in size, prior to having had any artificial defects mapped adjacent to the physical defect.

FIG. 8A shows a track 800 in a first state 800A, which comprises 204 sectors, and has a physical defect 811 of 80 sectors in size, beginning at the 34th sector and extending through the 113th sector, prior to having had any artificial defects mapped adjacent to the physical defect 811. In this example, container constitution 32 has designated the first 32 sectors as a first two containers of size 16 sectors each and comprising entirely functional sectors, and the final 76 sectors as four containers of size 15 sectors each and then a final container of size 16 sectors, as in example track 700 of FIG. 7. In between, container constitution 32 has designated a single container of size 16 functional sectors and which also includes the entirety of the physical defect 811 which comprises 80 physically defective sectors, with a single functional sector 841 prior to the physical defect and a set 842 of 15 more functional sectors after the physical defect. The latency to access container 823 which contains physical defect 811 to read or write is the same as for six containers with no skipped sectors.

Figure 8B:
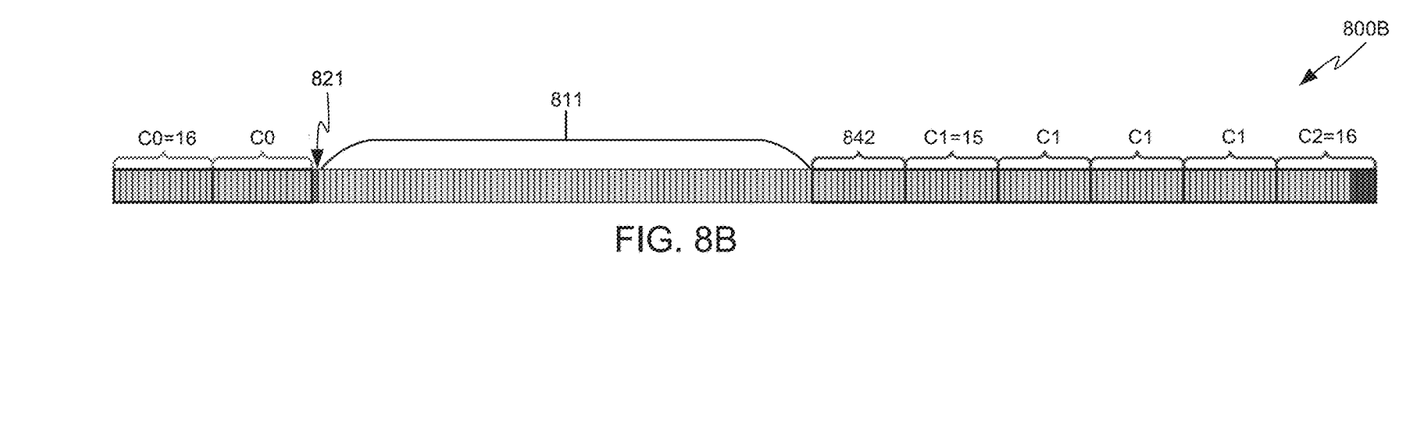
FIG. 8B shows the same track as in FIG. 8A except in a new state after control circuitry has mapped an artificial defect of a single sector in size adjacent to the physical defect, and having designated the set of 15 consecutively sequential sectors as a single container of size 15 sectors, instead of a section of a container of size 16 sectors, thereby taking advantage of the flexibility in the enabled sizes of containers in the container constitution rules in this example, in accordance with aspects of the present disclosure.

FIG. 8B shows the same track 800 as in FIG. 8A except in a new state as track 800B after control circuitry 22 has mapped an artificial defect 821, of a single sector in size, adjacent to the physical defect 811, and having designated the set 742 of 15 consecutively sequential sectors as a single container of size 15 sectors, instead of a section of a container of size 16 sectors, thereby taking advantage of the flexibility in the enabled sizes of containers in the container constitution rules in this example, in accordance with aspects of the present disclosure. The single artificial defect 821 is added in the physical sectors after the second container. Container constitution 32 now locates the large defect 821 between the second and third containers on track 800. Control circuitry 22 has thus eliminated a container with about four times its normal size in sectors and approximately quadruple the normal latency and instead prevented any container in track 800 from having any additional latency from inclusion of a physical defect, while giving up only a single sector of data storage capacity, in this example.

In examples above, control circuitry 22 may map artificial defects as part of the same process of mapping physical defects in rapid succession with first detecting the physical defects, or in a later process, in any order of operations. While the examples above may describe container constitution 32 making container assignments prior to mapping manipulator module 26 detecting interrupted containers and responding by mapping new artificial defects adjacent to physical defects to exclude the physical defects from containers, in other examples, mapping manipulator module 26 may detect interrupted containers and respond by mapping new artificial defects adjacent to physical defects to exclude the physical defects from containers, prior to container constitution 32 making initial container assignments, for example. Thus, the depictions of tracks 500A, 600A, and 800A of FIGS. 5A, 6A, and 8A, after container constitution assignments but before mapping of artificial defects to exclude or remove containers occupied by physical defects, may be physical depictions of such tracks in the indicated intermediate states in that order of operations, or may be hypothetical bases for comparison of how the states of the tracks would have been if not for assignment of the artificial defects to exclude physical defects from containers, in examples in which control circuitry 22 makes initial container constitution assignments only after assigning artificial defects adjacent to physical defects to exclude physical defects from containers.

Control circuitry 22 may use any of various algorithms to determine how much of a physical defect, if any, to tolerate within a container, and where and how to strike a balance of accepting some if any added latency from inclusion of physical defects before adding artificial defects and excluding the physical defects and areas adjacent to them from containers, in various examples. In various examples, control circuitry 22 may apply artificial defects to exclude physical defects from inclusion in any containers if the physical defects would cause a container to have a total size of at least or more than two times, or 1.5 times, or any multiple of times, of the normal container size with only functional sectors. In another example, control circuitry 22 may apply artificial defects to exclude any physical defects from inclusion in any containers. In various examples, control circuitry 22 may use any of various algorithms to exclude multiple physical defects using the smallest possible number of artificial defects and/or adding the smallest possible number of sectors to artificial defects, or in an optimization to achieve other sets of constrained optimization across various design goals and design criteria.

Thus, in various examples, control circuitry 22 may be configured to assign one or more data containers to portions of the recording medium that do not comprise the one or more physical defects or the one or more artificial defects, as indicated in the mapping of the recording medium. In various examples, control circuitry 22 may be configured to assign the one or more of the data containers to all of the portions of a track of the recording medium that do not comprise the one or more physical defects or the one or more artificial defects, such that the one or more of the data containers are free of the one or more physical defects. In various examples, control circuitry 22 may be configured such that designating the one or more artificial defects adjacent to the one or more physical defects in the mapping of the recording medium comprises designating the one or more artificial defects each to have a size that, in combination with a size of each of the one or more physical defects, in accordance with a specification for the data containers, precludes assigning a data container to include any of the one or more physical defects.

In various examples, control circuitry 22 may be configured such that the designating of the one or more artificial defects leaves a remaining functional portion of the track to have a size equal to a size of an integer number of data containers, such as the two containers in the examples of FIGS. 5B and 6B, and the eight containers in the example of FIG. 8B. In various examples, control circuitry 22 may be configured to determine one or more functional portions of the track that are adjacent to the one or more physical defects and that are not large enough to form one or more containers, after any other containers have been assigned to the track, wherein the one or more artificial defects adjacent to the one or more physical defects in the mapping of the recording medium are designated to correspond to the one or more functional portions of the track that are adjacent to the one or more physical defects and that are not large enough to form one or more containers, as in the examples of FIGS. 5B, 6B, and 8B.

In various examples, control circuitry 22 may be configured to select from among two or more container sizes, enabled by a specification for the containers, in assigning containers to functional portions of the track not occupied by the one or more physical defects, prior to designating the one or more artificial defects, as in the example of FIG. 8B of selecting to assign another container of size 15 blocks to take advantage of an available consecutive sequence of only 15 blocks left over between other blocks and a physical defect, rather than maintaining an initial or default determination of attempting to include those 15 blocks in a container of size 16 blocks. Control circuitry 22 may also perform more involved analysis in various examples in which there may be larger numbers of potentially available functional blocks, as well as potentially still greater flexibility in available sizes of containers enabled by a specification for the containers and the container constitution. As one illustrative example, a specification for containers may enable three different sizes of either 15, 16, or 17 blocks each. Control circuitry 22 may analyze all available permutations of available consecutive sequences of blocks between physical defects and all available container sizes in determining how to optimize assigning containers and designating artificial defects adjacent to physical defects to lead to the selected container assignments, in various examples.

In various examples, control circuitry 22 may be configured such that designating the one or more physical defects for exclusion from being assigned to the data containers comprises designating any of the one or more physical defects that are of at least a selected size for exclusion from being assigned to the data containers, such as by assigning artificial defects adjacent to any physical defects that are of at least a selected size, such as two, three, four, or any selected number of blocks, which would otherwise be included in a container. In various examples, control circuitry 22 may be configured such that designating the one or more physical defects for exclusion from being assigned to the data containers comprises designating any of the one or more physical defects that would otherwise become included in a container for exclusion from being assigned to the data containers, such as by assigning artificial defects adjacent to any physical defects of any size, which would otherwise be included in a container. As noted above, assignment of data to sectors and tracks may be considered and referred to symmetrically such that data blocks and containers may be considered as assigned to sectors and tracks of a disk surface, and sectors, track sections, and tracks of a disk surface may symmetrically be considered assigned to those data blocks and containers, and such that physical defects and artificial defects may be excluded from assignment to data blocks and containers, as a reciprocal way of stating that data blocks and containers are excluded from being assigned to sectors and track sections of a disk surface covered by or corresponding with physical defects and/or artificial defects, in various examples.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator arm assembly comprising one or more heads, and configured to position the one or more heads proximate to disk surfaces of the one or more disks; and
   one or more processing devices, configured to:
      detect one or more physical defects on a recording medium;
      designate, in a mapping of the recording medium, the one or more physical defects for exclusion from being assigned to data containers, the data containers configured for assignment of a plurality of logic blocks to the data containers, the logic blocks configured to store data to be written in an interleaved pattern across a plurality of sectors based on a distributed sector encoding scheme; and
      designate one or more artificial defects adjacent to the one or more physical defects for exclusion from being assigned to the data containers in the mapping.

2. The data storage device of claim 1, wherein the one or more processing devices are further configured to:
   assign one or more of the data containers to one or more portions of the recording medium that do not comprise the one or more physical defects or the one or more artificial defects, as indicated in the mapping of the recording medium.

3. The data storage device of claim 2, wherein the one or more processing devices are further configured to:
   assign the one or more of the data containers to all of the portions of a track of the recording medium that do not comprise the one or more physical defects or the one or more artificial defects, such that the one or more of the data containers are free of the one or more physical defects.

4. The data storage device of claim 1, wherein the one or more processing devices are further configured such that designating the one or more artificial defects adjacent to the one or more physical defects in the mapping of the recording medium comprises designating the one or more artificial defects each to have a size that, in combination with a size of each of the one or more physical defects, in accordance with a specification for the data containers, precludes assigning a data container to include any of the one or more physical defects.

5. The data storage device of claim 1, wherein the one or more processing devices are further configured such that the designating of the one or more artificial defects leaves a remaining functional portion of the track to have a size equal to a size of an integer number of the data containers.

6. The data storage device of claim 1, wherein the one or more processing devices are further configured to:
determine one or more functional portions of the track that are adjacent to the one or more physical defects and that are not large enough to form one or more containers, after any other containers have been assigned to the track,
wherein the one or more artificial defects adjacent to the one or more physical defects in the mapping of the recording medium are designated to correspond to the one or more functional portions of the track that are adjacent to the one or more physical defects and that are not large enough to form one or more of the containers.

7. The data storage device of claim 1, wherein designating one or more artificial defects comprises:
designating a first artificial defect on a first side of a selected physical defect, from among the one or more physical defects, and a second artificial defect on a second side of the selected physical defect.

8. The data storage device of claim 1, wherein the one or more physical defects comprise at least a first physical defect and a second physical defect, and wherein designating one or more artificial defects comprises:
designating at least a first artificial defect adjacent to the first physical defect and at least a second artificial defect adjacent to the second physical defect.

9. The data storage device of claim 1, wherein the one or more processing devices are further configured to:
select from among two or more container sizes, enabled by a specification for the containers, in assigning the data containers to functional portions of the track not occupied by the one or more physical defects, prior to designating the one or more artificial defects.

10. The data storage device of claim 1, wherein designating the one or more physical defects for exclusion from being assigned to the data containers comprises designating any of the one or more physical defects that are of at least a selected size for exclusion from being assigned to the data containers.

11. The data storage device of claim 1, wherein designating the one or more physical defects for exclusion from being assigned to the data containers comprises designating any of the one or more physical defects that would otherwise become included in a data container for exclusion from being assigned to the data containers.

12. The data storage device of claim 1, wherein the one or more processing devices are further configured to:
determine an integer number of one or more of the data containers that may fit into a track on the recording medium, at any available positions between a beginning and an end of the track and between any of the one or more physical defects;
assign the integer number of one or more of the data containers among the available positions; and
designate any remaining portions of the track as artificial defects.

13. A method comprising:
detecting, by one or more processing devices, one or more physical defects on a recording medium;
designating, by the one or more processing devices, in a mapping of the recording medium, the one or more physical defects for exclusion from being assigned to data containers, the data containers configured for assignment of a plurality of logic blocks to the data containers, the logic blocks configured to store data to be written in an interleaved pattern across a plurality of sectors based on a distributed sector encoding scheme; and
designating, by the one or more processing devices, one or more artificial defects adjacent to the one or more physical defects for exclusion from being assigned to the data containers in the mapping.

14. The method of claim 13, further comprising:
assigning one or more of the data containers to one or more portions of the recording medium that do not comprise the one or more physical defects or the one or more artificial defects, as indicated in the mapping of the recording medium.

15. The method of claim 14, further comprising:
assigning the one or more of the data containers to all of the portions of a track of the recording medium that do not comprise the one or more physical defects or the one or more artificial defects, such that the one or more of the data containers are free of the one or more physical defects.

16. The method of claim 13, wherein designating one or more artificial defects comprises:
designating a first artificial defect on a first side of a selected physical defect, from among the one or more physical defects, and a second artificial defect on a second side of the selected physical defect.

17. One or more processing devices comprising:
means for detecting one or more physical defects on a recording medium;
means for designating, in a mapping of the recording medium, the one or more physical defects for exclusion from being assigned to the data containers, data containers configured for assignment of a plurality of logic blocks to the data containers, the logic blocks configured to store data to be written in an interleaved pattern across a plurality of sectors based on a distributed sector encoding scheme; and
means for designating one or more artificial defects adjacent to the one or more physical defects for exclusion from being assigned to the data containers in the mapping,
wherein the means for designating the one or more artificial defects leaves a remaining functional portion of the track to have a size equal to a size of an integer number of the data containers.

18. The one or more processing devices of claim 17, further comprising:
means for assigning one or more of the data containers to one or more portions of the recording medium that do not comprise the one or more physical defects or the one or more artificial defects, as indicated in the mapping of the recording medium.

19. The one or more processing devices of claim 18, further comprising:
means for assigning the one or more of the data containers to all of the portions of a track of the recording medium that do not comprise the one or more physical defects or the one or more artificial defects, such that the one or more of the data containers are free of the one or more physical defects.

20. The one or more processing devices of claim 17, wherein the means for designating one or more artificial defects comprises:
means for designating a first artificial defect on a first side of a selected physical defect, from among the one or more physical defects, and a second artificial defect on a second side of the selected physical defect.

* * * * *